US009392322B2

(12) United States Patent
Thorson

(10) Patent No.: US 9,392,322 B2
(45) Date of Patent: Jul. 12, 2016

(54) METHOD OF VISUALLY SYNCHRONIZING DIFFERING CAMERA FEEDS WITH COMMON SUBJECT

(75) Inventor: Dean E. Thorson, Grayslake, IL (US)

(73) Assignee: Google Technology Holdings LLC, Mountain View, CA (US)

(*) Notice: Subject to any disclaimer, the term of this patent is extended or adjusted under 35 U.S.C. 154(b) by 793 days.

(21) Appl. No.: 13/468,098

(22) Filed: May 10, 2012

(65) Prior Publication Data

US 2013/0300933 A1 Nov. 14, 2013

(51) Int. Cl.
H04N 21/43 (2011.01)
H04N 21/439 (2011.01)
H04N 21/44 (2011.01)
H04N 21/462 (2011.01)

(52) U.S. Cl.
CPC ....... *H04N 21/4307* (2013.01); *H04N 21/4394* (2013.01); *H04N 21/44008* (2013.01); *H04N 21/4622* (2013.01)

(58) Field of Classification Search
USPC .......................................... 348/157; 386/201
See application file for complete search history.

(56) References Cited

U.S. PATENT DOCUMENTS

| 4,881,127 | A | 11/1989 | Isoguchi et al. |
| 5,294,990 | A | 3/1994 | Aoki et al. |
| 5,505,199 | A | 4/1996 | Kim |
| 5,909,246 | A | 6/1999 | Terashima |
| 6,167,356 | A | 12/2000 | Squadron et al. |
| 6,347,925 | B1 | 2/2002 | Woodard et al. |
| 6,529,253 | B1 | 3/2003 | Matsute |
| 6,614,471 | B1 | 9/2003 | Ott |
| 7,190,263 | B2 | 3/2007 | McKay et al. |
| 7,301,563 | B1 | 11/2007 | Kakinuma et al. |
| 7,414,665 | B2 | 8/2008 | Watanabe et al. |
| 7,450,187 | B2 | 11/2008 | Sun |
| 8,295,631 | B2 | 10/2012 | Adams et al. |
| 8,619,128 | B2 | 12/2013 | Bilbrey et al. |
| 8,803,985 | B2 | 8/2014 | Kaizu et al. |
| 9,143,749 | B2 | 9/2015 | Wernersson |
| 9,344,639 | B2 | 5/2016 | Musatenko et al. |

(Continued)

FOREIGN PATENT DOCUMENTS

| CA | WO 2007128114 A1 * | 11/2007 | ............ H04N 5/126 |
| EP | 2043360 | 4/2009 | |

(Continued)

OTHER PUBLICATIONS

European Patent Office, International Search Report and the Written Opinion in International Patent Application PCT/US2013/040347 (Jul. 23, 2013).

(Continued)

*Primary Examiner* — Dave Czekaj
*Assistant Examiner* — Shanika Brumfield
(74) *Attorney, Agent, or Firm* — Wolfe-SBMC

(57) ABSTRACT

Embodiments of the present invention provide a system and method to automatically generate synchronization points based on a common characteristic given a plurality of random video feeds. The common characteristic can be based on changes in motion, audio, image, etc between the feeds. A feedback process attempts to time align the synchronized video outputs based on discontinuities in the feeds. Once the video feeds are time aligned, the aligned content can be used for recreating a multi-view video montage or feeding it into a 3-D correlation program.

21 Claims, 6 Drawing Sheets

(56) References Cited

U.S. PATENT DOCUMENTS

| | | |
|---|---|---|
| 2002/0047909 A1 | 4/2002 | Hatae et al. |
| 2002/0080263 A1 | 6/2002 | Krymski |
| 2003/0007088 A1 | 1/2003 | Rantanen et al. |
| 2003/0052989 A1 | 3/2003 | Bean et al. |
| 2004/0107103 A1* | 6/2004 | Iyengar ............ 704/270 |
| 2005/0154318 A1 | 7/2005 | Sato et al. |
| 2005/0206820 A1 | 9/2005 | Palmer |
| 2006/0156374 A1 | 7/2006 | Hu et al. |
| 2007/0090283 A1 | 4/2007 | Linke et al. |
| 2007/0115459 A1 | 5/2007 | Nakao et al. |
| 2007/0201815 A1 | 8/2007 | Griffin |
| 2007/0237423 A1 | 10/2007 | Tico et al. |
| 2008/0077020 A1 | 3/2008 | Young et al. |
| 2009/0086074 A1 | 4/2009 | Li et al. |
| 2009/0087099 A1 | 4/2009 | Nakamura |
| 2009/0109309 A1 | 4/2009 | He et al. |
| 2009/0189992 A1 | 7/2009 | Zhang et al. |
| 2009/0190803 A1 | 7/2009 | Neghina et al. |
| 2010/0091119 A1 | 4/2010 | Lee |
| 2010/0097491 A1 | 4/2010 | Farina et al. |
| 2010/0149393 A1 | 6/2010 | Zarnowski et al. |
| 2010/0195912 A1 | 8/2010 | Nakada et al. |
| 2010/0208082 A1 | 8/2010 | Buchner et al. |
| 2010/0271469 A1 | 10/2010 | She |
| 2010/0309333 A1 | 12/2010 | Smith et al. |
| 2010/0309334 A1 | 12/2010 | James et al. |
| 2010/0309335 A1 | 12/2010 | Brunner et al. |
| 2011/0013807 A1 | 1/2011 | Lee et al. |
| 2011/0043691 A1 | 2/2011 | Guitteny et al. |
| 2011/0052136 A1* | 3/2011 | Homan ............ H04N 21/242 386/201 |
| 2011/0069189 A1 | 3/2011 | Venkataraman et al. |
| 2011/0122315 A1 | 5/2011 | Schweiger et al. |
| 2011/0205433 A1 | 8/2011 | Altmann et al. |
| 2012/0081579 A1 | 4/2012 | Doepke |
| 2012/0105584 A1 | 5/2012 | Gallagher et al. |
| 2012/0314901 A1 | 12/2012 | Hanson et al. |
| 2013/0016251 A1 | 1/2013 | Ogasahara |
| 2013/0057713 A1 | 3/2013 | Khawand |
| 2013/0208138 A1 | 8/2013 | Li et al. |
| 2013/0208143 A1 | 8/2013 | Chou et al. |
| 2013/0271602 A1 | 10/2013 | Bentley et al. |
| 2013/0314511 A1 | 11/2013 | Chen et al. |
| 2014/0009634 A1 | 1/2014 | Hiwada et al. |
| 2014/0063300 A1 | 3/2014 | Lin et al. |
| 2014/0074265 A1 | 3/2014 | Arginsky et al. |
| 2014/0085495 A1 | 3/2014 | Almalki et al. |
| 2014/0160326 A1 | 6/2014 | Black |
| 2014/0232929 A1 | 8/2014 | Ichikawa |
| 2014/0244617 A1 | 8/2014 | Rose |
| 2014/0358473 A1 | 12/2014 | Goel et al. |
| 2015/0195482 A1 | 7/2015 | Wise |
| 2015/0271405 A1 | 9/2015 | Lameer et al. |
| 2015/0288869 A1 | 10/2015 | Furuhashi |
| 2015/0318020 A1 | 11/2015 | Pribula |
| 2015/0341546 A1 | 11/2015 | Petrescu et al. |
| 2015/0341547 A1 | 11/2015 | Petrescu et al. |
| 2015/0341548 A1 | 11/2015 | Petrescu et al. |
| 2015/0341549 A1 | 11/2015 | Petrescu et al. |
| 2015/0341550 A1 | 11/2015 | Lay |
| 2015/0341561 A1 | 11/2015 | Petrescu et al. |
| 2016/0037055 A1 | 2/2016 | Waddington |
| 2016/0050354 A1 | 2/2016 | Musatenko et al. |
| 2016/0080626 A1 | 3/2016 | Kovtun et al. |

FOREIGN PATENT DOCUMENTS

| | | | |
|---|---|---|---|
| EP | 2645700 | | 3/2012 |
| EP | 2852147 | | 3/2015 |
| KR | 20070005947 | | 1/2007 |
| WO | WO 2005/099251 A1 | | 10/2005 |
| WO | WO 2007128114 A1 * | 11/2007 | ............ H04N 5/12 |
| WO | WO 2010/068175 A2 | | 6/2010 |
| WO | WO-2012166044 | | 12/2012 |
| WO | WO-2013172335 | | 11/2013 |

OTHER PUBLICATIONS

International Bureau of WIPO, International Preliminary Report on Patentability in International Patent Application PCT/US2013/040347 (Nov. 20, 2014).

Dexter, Emile et al.: "Multi-view Synchronization of Human Actions and Dynamic Scenes", in Proc. British Machine Vision Conference (BMVC'09), London, UK, Sep. 2009, all pages.

Whitehead, Anthony et al.: "Temporal Synchronization of Video Sequences in Theory and in Practice", Proceedings WACV-Motion '05 Proceedings of the IEEE Workshop on Motion Video Computing (WACV/Motion'05)—vol. 2-vol. 02, IEEE Computer Society Washington, DC, USA 2005, all pages.

"Advisory Action", U.S. Appl. No. 11/931,828, May 30, 2014, 3 pages.

"Final Office Action", U.S. Appl. No. 11/931,828, Jan. 14, 2014, 14 pages.

"Final Office Action", U.S. Appl. No. 11/931,828, May 13, 2010, 17 pages.

"Final Office Action", U.S. Appl. No. 11/931,828, Jun. 11, 2015, 16 pages.

"International Search Report and Written Opinion", Application No. PCT/US2015/018869, May 20, 2015, 10 pages.

"International Search Report and Written Opinion", Application No. PCT/US2015/023238, Jun. 22, 2015, 11 pages.

"International Search Report and Written Opinion", Application No. PCT/US2015/023250, Jun. 22, 2015, 12 pages.

"International Search Report and Written Opinion", Application No. PCT/US2015/023241, Jun. 23, 2015, 12 pages.

"New Blink Apps Even More Creative", Retrieved from: http://research.microsoft.com/en-us/news/features/blink-061813.aspx, Jun. 18, 2013, 4 pages.

"Non-Final Office Action", U.S. Appl. No. 11/931,828, Jul. 12, 2013, 21 pages.

"Non-Final Office Action", U.S. Appl. No. 11/931,828, Oct. 7, 2015, 22 pages.

"Non-Final Office Action", U.S. Appl. No. 11/931,828, Nov. 19, 2014, 20 pages.

"Non-Final Office Action", U.S. Appl. No. 11/931,828, Dec. 30, 2009, 14 pages.

"Non-Final Office Action", U.S. Appl. No. 14/218,194, Sep. 11, 2015, 7 pages.

"Non-Final Office Action", U.S. Appl. No. 14/448,199, Sep. 17, 2015, 14 pages.

"Non-Final Office Action", U.S. Appl. No. 14/450,573, Dec. 23, 2015, 10 pages.

"Non-Final Office Action", U.S. Appl. No. 14/457,374, Nov. 13, 2015, 12 pages.

"Non-Final Office Action", U.S. Appl. No. 14/487,785, Sep. 25, 2015, 8 pages.

"Powershot SX700HS Camera User Guide", Retrieved from the Internet: http://gdlp01.c-wss.com/gds/7/0300014407/02/PowerShot_SX700HS_Camer_User_Guide_EN.pdf, Mar. 29, 2014, 196 pages.

"Restriction Requirement", U.S. Appl. No. 14/450,390, Dec. 16, 2015, 6 pages.

"Restriction Requirement", U.S. Appl. No. 14/450,522, Dec. 24, 2015, 6 pages.

"Restriction Requirement", U.S. Appl. No. 14/450,553, Jan. 7, 2016, 6 pages.

"Restriction Requirement", U.S. Appl. No. 14/450,573, Sep. 1, 2015, 6 pages.

Notice Of Allowance, U.S. Appl. No. 14/457,374, Feb. 10, 2016, 15 pages.

Notice Of Allowance, U.S. Appl. No. 14/218,194, Feb. 26, 2016, 5 pages.

Notice Of Allowance, U.S. Appl. No. 14/448,199, Apr. 5, 2016, 10 pages.

(56) References Cited

OTHER PUBLICATIONS

Notice Of Allowance, U.S. Appl. No. 14/487,785, Feb. 1, 2016, 9 pages.
Restriction Requirement, U.S. Appl. No. 14/450,461, Jan. 20, 2016, 6 pages.
Corrected Notice of Allowance, U.S. Appl. No. 14/487,785, May 3, 2016, 4 pages.
Final Office Action, U.S. Appl. No. 11/931,828, May 6, 2016, 23 pages.
Final Office Action, U.S. Appl. No. 14/450,573, May 19, 2016, 12 pages.
Non-Final Office Action, U.S. Appl. No. 14/450,390, Apr. 8, 2016, 10 pages.
Non-Final Office Action, U.S. Appl. No. 14/450,461, May 6, 2016, 9 pages.
Non-Final Office Action, U.S. Appl. No. 14/450,522, May 5, 2016, 13 pages.
Supplemental Notice of Allowance, U.S. Appl. No. 14/218,194, May 3, 2016, 2 pages.

\* cited by examiner

METHOD OF VISUALLY SYNCHRONIZING DIFFERING CAMERA FEEDS WITH COMMON SUBJECT

BACKGROUND

Embodiments of the present invention relate to streaming media, in particular, synchronizing differing video feeds for a common event or activity streamed from selected camera sources.

What is needed is a system and method for synchronizing differing camera feeds to generate time aligned content. As a result, the information contained in different camera feeds may be presented as-is to the consumer, with varying delays and resolutions.

BRIEF SUMMARY OF THE DRAWINGS

The accompanying drawings, which are incorporated in and form a part of the specification, illustrate an exemplary embodiment of the present invention and, together with the description, serve to explain the principles of the invention. In the drawings.

DETAILED DESCRIPTION

Figure 1:
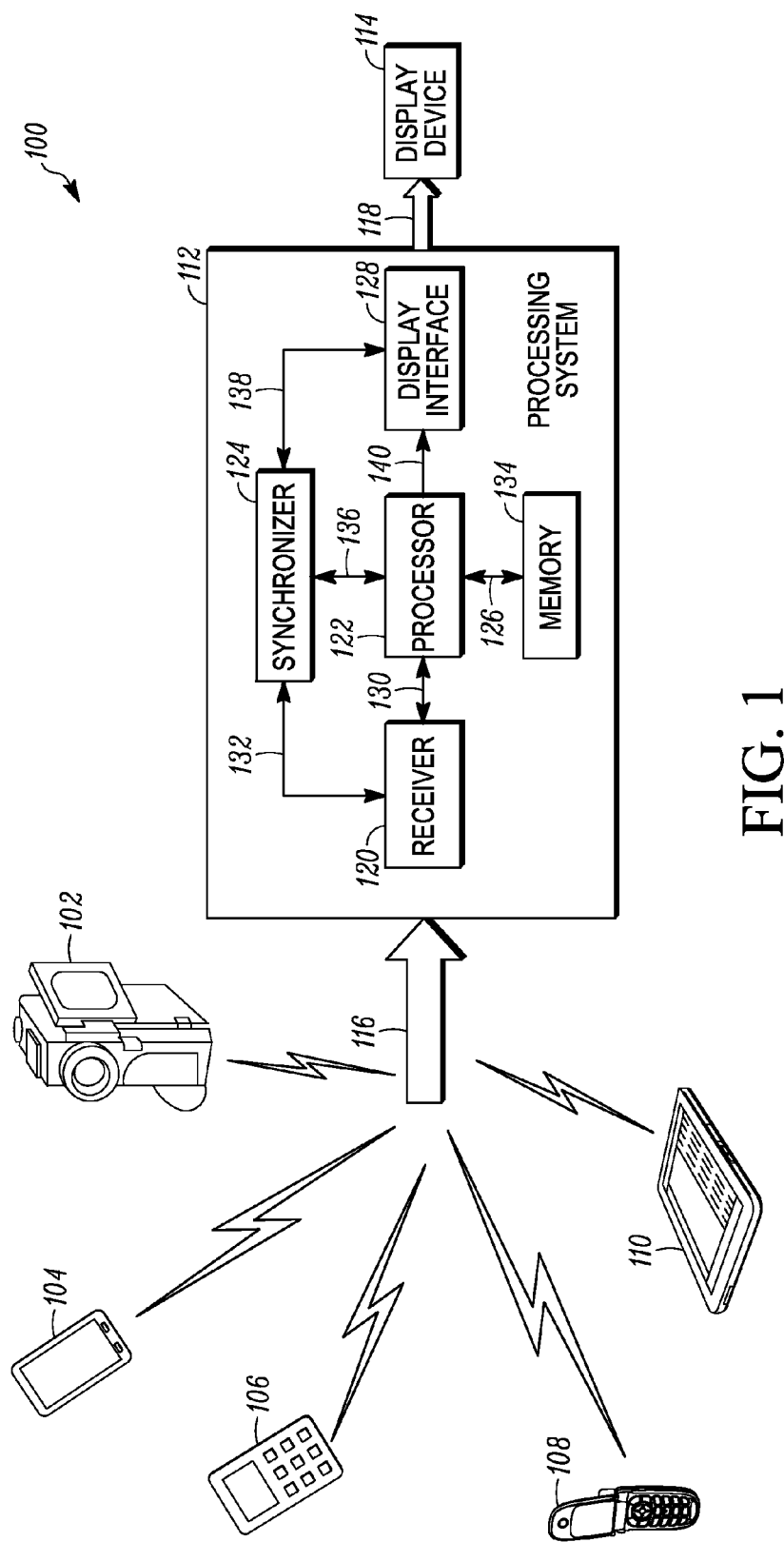
FIG. 1 illustrates a conventional media system.

Embodiments of the present invention provide a system and method for synchronizing differing camera feeds to generate time aligned content.

In accordance with embodiments of the present invention, a device is provided for use with a first video feed and a second video feed. The device includes a receiver portion, a determining portion, a synchronization portion and a time aligning portion. The receiver portion can receive both the first and second video feeds, can receive the second video feed, can generate a first output video based on the first video feed and can generate a second output video based on the second video feed. The first video feed includes first discontinuity data corresponding to a first discontinuity and second discontinuity data corresponding to a second discontinuity. The second video feed includes third discontinuity data corresponding to a third discontinuity and fourth discontinuity data corresponding to a fourth discontinuity. The determining portion can detect the first discontinuity, the second discontinuity, the third discontinuity and the fourth discontinuity. The synchronization portion can synchronize the second output video with the first output video based on the first discontinuity and the third discontinuity. The time aligning portion can generate a comparison based on the second discontinuity and the fourth discontinuity. The synchronizing portion can further adjust the synchronization of the first output video and the second output video based on the comparison.

Additional advantages and novel features of the invention are set forth in part in the description which follows, and in part will become apparent to those skilled in the art upon examination of the following or may be learned by practice of the invention. The advantages of the invention may be realized and attained by means of the instrumentalities and combinations particularly pointed out in the appended claims.

Coordinating video feeds with multiple views of an event or an activity streamed to a common location from random camera sources can be a challenging task. As an example, camera feeds from real time reception of cellular phone video from news locations or sporting events may have different characteristics. Each imager and compression technique may have a different delay and encoding mechanism. For example, videos recorded with a regular camcorder or a GSM (Global System for Mobile Communications) phone or a CDMA (Code Division Multiple Access) phone have different characteristics. The common consolidation point for all the video feeds streamed from different camera sources is that a person has to examine all these feeds and attempt to synchronize and pull out all the information that would be used in order to recreate a best possible video output that can be used to reconstruct a 3-D view of the video feeds or provide the best shot available.

Methods of taking multiple view video feeds and recreating a 3-D map of such videos are known in the art. Digital videos produced professionally typically contain embedded time codes to facilitate synchronization of different feeds. In addition to time codes (or in place of), professional producers or savvy amateurs use sound sticks, clapboards, hand claps, strobe flashes, and such to insert deliberate synchronization points into a captured video. In the absence of deliberate synchronization events, video editors will search for eye blinks, sharp sounds, light flashes, or similar short duration events to use as synchronization points. Video editing software such as Adobe Premier Pro® allow a user to insert synchronization markers and time codes, and provide various features to assist in editing a multi-camera sequence.

Synchronization of multiple video sources, such as videos captured and streamed by smart phones is now in need. As discussed earlier, camera feeds from real time reception of cellular phone video of a news event may have different frame rates, resolutions and orientations. Furthermore, non-commercial video sources do not have embedded time codes that could be used as synchronization points. Additionally, streaming video over cellular and IP (Internet Protocol) networks can disrupt synchronization.

The conventional methods that take multiple view video feeds and recreate a 3-D map of the videos are generally computationally intensive and inefficient. A conventional media system will now be discussed with reference to FIG. 1.

FIG. 1 illustrates a conventional media system 100.

As illustrated in the figure, conventional media system 100 includes a plurality of media feeds streaming from a camcorder 102, a mobile phone 104, a mobile phone 106, a mobile phone 108 and a computer tablet 110. Generally, media feeds contain both audio and video and are compressed for storage and streaming. Since each media feed originates from a different source, it may have a different set of delay and encoding mechanisms. In one example, mobile phone 104 is a GSM phone, whereas mobile phone 106 is a CDMA phone, hence, each uses a different media compression codec. Additionally, each media feed may contain a different perspective or view of the event or the activity.

Conventional media system 100 further includes a processing system 112 and a display device 114. Media feeds from camcorder 102, mobile phone 104, mobile phone 106, mobile phone 108 and computer tablet 110 are streamed to processing system 112 via a telecommunication network 116. Any network protocol, such as, Transmission Control Protocol (TCP), Real-Time Streaming Protocol (RTSP), or Real-time Transport Protocol (RTP) may be used for streaming the media over telecommunication network 116.

Processing system 112 communicates with display device 114 via a communication channel 118. Processing system 112 further includes a receiver 120, a processor 122, a synchronizer 124, a memory 126 and a display interface 128.

Receiver 120 is operable to receive individual streams from camcorder 102, mobile phone 104, mobile phone 106, mobile phone 108 and computer tablet 110. In some cases, receiver 120 includes a decoding system for decoding each individual encoded stream based on the corresponding codec. Additionally, receiver 120 may include a memory buffer to store the incoming streams. Receiver 120 bi-directionally communicates with processor 122 via a signal 130 to exchange data and controls.

Processor 122 is operable to communicate with receiver 120, synchronizer 124, memory 126, and display interface 128 in order to execute a set of instructions that would enable: Receiver 120 to receive various video feeds and decode them as needed; Synchronizer 124 to synchronize the video feeds based on the available synchronization points; Display interface 128 to prepare the video content and forward it for displaying on display device 114. Processor 122 is further operable to bi-directionally communicate with memory 126 via a signal 134. Memory 126 may include a program memory, a data memory or a combination of both.

Synchronizer 124 is operable to bi-directionally communicate with processor 122 via a signal 136, with display interface 128 via a signal 138, and with receiver 120 via a signal 132. Synchronizer 124 is further operable to receive video streams from receiver 120, which may have time codes embedded within the video streams, and to use them for synchronizing various camera feeds.

Display interface 128 is operable to receive controls from processor 122 via a signal 140 and to receive synchronized media streams from synchronizer 124 that can be used to create a 3-D image of the video feeds.

Display device 114 is operable to receive the media streams from processing system 112 for displaying the video recreated from various video feeds. Some commercial solutions can provide synchronization time codes with the video streams; however, the cost of these solutions is prohibitive. Additionally, timing synchronization is not incorporated in non-commercial encoders. Capture and delivery delay from multiple sources varies for different feeds. Handheld videos can be delivered at different rates, whereas, delivery delay on 3G (Third Generation) systems has more latency and jitter than is present in 4G/Wi-Fi systems.

Due to the differences in the various video feeds produced by different camera sources, conventional media systems use human intervention in order to synchronize and pull out all the information that can be used to create a video based on different camera feeds. These conventional media systems typically compare a frame of one video feed with frames in other video feeds to synchronize various video feeds. Some of the popular approaches for video synchronization have been mostly feature based, intensity based or camera motion based, which are discussed below.

Feature based approach is the most commonly used synchronization method that detects the image features, such as, highly discriminative points or edges in the video frames and attempts relating to corresponding features in other sequences. The basic premise is that the motion of frame features, which corresponds to the same 3-D point, are correlated among the different camera feeds. The major disadvantage of this approach is that reliably detecting, matching and tracking the features through the sequences can be a cumbersome process.

The intensity based approach processes the frames pixel-by-pixel by performing mathematical operations on large scale. An intensity based approach focuses on establishing a mapping from every pixel in one video to a pixel in the second one, and, therefore, is very computationally intensive. Generally, intensity based approaches are not capable of dealing with moving cameras.

Camera motion based approach comprises very specialized scenarios with rigidly linked cameras, which is a very restrictive assumption. Camera motion based approaches are fast compared to Feature based and Intensity based; however, they assume a rigid mounting and baseline of the camera.

In addition to problems encountered with these different approaches, as discussed above, a known problem is that observation directions differing by some more than 30° are not supported by any of these approaches, thereby, limiting the viewing directions.

There are hardware based synchronization systems, which allow the highest robustness and accuracy; however, they are not applicable to end-user devices due to their complexity and requirements with respect to the infrastructure. Another synchronization method, which uses time stamp based approach, focuses on tagging the media content with time stamps based on individual internal device clocks and can be susceptible to unlimited discrepancies. Moreover, hardware and time stamp based approaches are not applicable retroactively to already existing videos.

As discussed above, most of the software based approaches, such as feature based, intensity based or camera motion based imply a high computational complexity. A conventional synchronization approach for synchronizing two video feeds is discussed below with the help of FIG. 2.

Figure 2:
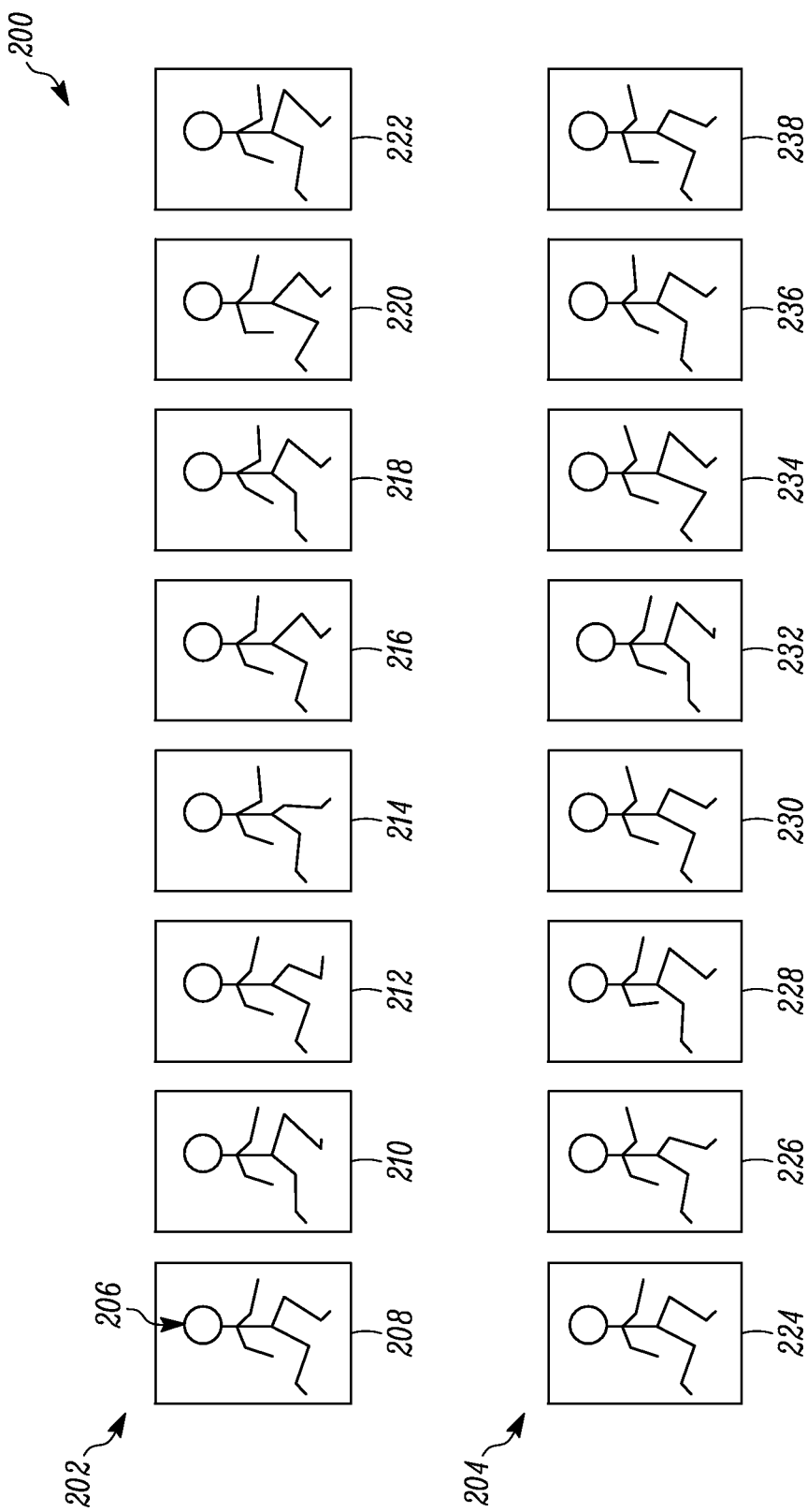
FIG. 2 illustrates two video feeds that need to be synchronized.

FIG. 2 illustrates two video feeds that need to be synchronized.

As illustrated in the figure, a scenario 200 includes a video feed 202 and a video feed 204 that need to be synchronized. Video feed 202 contains a sequence of frames 208-222 from one camera source. Video feed 204 contains another sequence of frames 224-238 from another camera source. The two camera sources may or may not have the same encoding mechanism. For illustrative purposes, video feed 202 and video feed 204 are shown to contain only eight frames each with different positions of a person 206.

A conventional processing system, such as processing system 112, will compare both feeds frame by frame in order to synchronize the feeds. As an example, frame 208 is compared against each of frames 224-238 to find a matching frame. Similarly, frame 210 is compared against each of frames 224-238 and so on. In this example, frame 210 of video feed 202 matches with frame 232 of feed 204. Therefore, synchronizer 124 will insert synchronization points based on matching frames 210 and 232. Similarly, if another frame of video feed 202 matches with a frame of video feed 204, there will be another synchronization point inserted based on that and so on.

In order to compare a plurality of video feeds from multiple camera sources, the frames need to be processed due to different formats of the video feeds. Such processing may require manipulation of the images in some cases for proper comparison. Hence, processing multiple video feeds for synchronization can be computationally intensive. In the absence of an automated process for synchronization, using manual process for synchronization through visual means can be a cumbersome and inefficient process.

Embodiments of the present invention provide a system and method for inserting synchronization points for synchronizing multiple unsynchronized video feeds to generate time-aligned content by providing a timing reference hidden within the video stream itself for coordination. Some non-limiting examples for generating the synch points may be motion detection, face recognition, changes in audio, luminance or chrominance, etc. Multiple views of the video feeds can be consolidated for creating a multi-view video montage or feeding into a 3-D correlation program.

Embodiments of the present invention address synchronization of multiple unsynchronized video sources, such as videos captured and streamed by smart phones for a common event or activity. Such videos may include plurality of video feeds, where each feed may or may not have different views of the videos that need to be synchronized. As discussed earlier, video sources may have different frame rates, resolutions and orientations. Additionally, non-commercial videos do not have embedded time codes that could be used as synchronization points. One possible use of synchronizing video feeds from multiple smart phones could be in a situation in which several smart phones captured a breaking news event and the resulting video feeds were gathered and redistributed as a montage by a news agency.

As discussed earlier with reference to FIG. 1, video feeds from various smart phones, camcorders and such have different characteristics due to their different encoding mechanism. Additionally different video feeds may have different view of the event recorded. As an example, a video feed may have an image recorded from the front, while another feed may have the same image recorded from a 30° angle, and a third video feed may have the same image recorded from the back.

In accordance with embodiments of the present invention, a processing system receives unsynchronized video feeds for a common event or activity from various video sources, such as, camcorder 102, mobile phone 104, mobile phone 106, mobile phone 108 and computer tablet 110, and time aligns these video feeds based on a recognized discontinuity.

A discontinuity may be considered a change between two frames. The discontinuity may be based on image, motion and/or sound. For example, consider the situation wherein in a video, a person is waving his hand. In this situation, suppose the hand is traveling in a direction from left to right. At some point, the hand will then travel from right to left. This change in motion may be considered a discontinuity in motion. In another example, consider the situation wherein in a video, there is an explosion. In this situation, the discontinuity is between the image before the explosion, when everything is clear, and after the explosion, when the image is bright and colorful. Further, a discontinuity may be a discontinuity in sound. For example, consider the situation wherein in a video, a person is walking on the street and a loud horn blares from a vehicle. In accordance with embodiments of the present invention, a discontinuity can be determined based on a change in a characteristic of the video feed.

In accordance with an embodiment of the present invention, a processing system finds a discontinuity between the frames of one video feed and attempts to find the same discontinuity in other video feeds, in order to synchronize all the video feeds based on the common discontinuity. For a given length of video feeds, the processing system attempts to find a number of discontinuities. Two video feeds for a common event, recorded from different locations and with different camera sources, may have totally different images of the event but may have the same discontinuity in both the video feeds. In contrast to conventional processing systems, where a series of frames need to be compared with another series of frames in order to detect a common image for synchronization, the current approach detects discontinuities between the frames, and, hence, involves fewer computations. This will now be explained with reference to FIG. 3.

Figure 3:
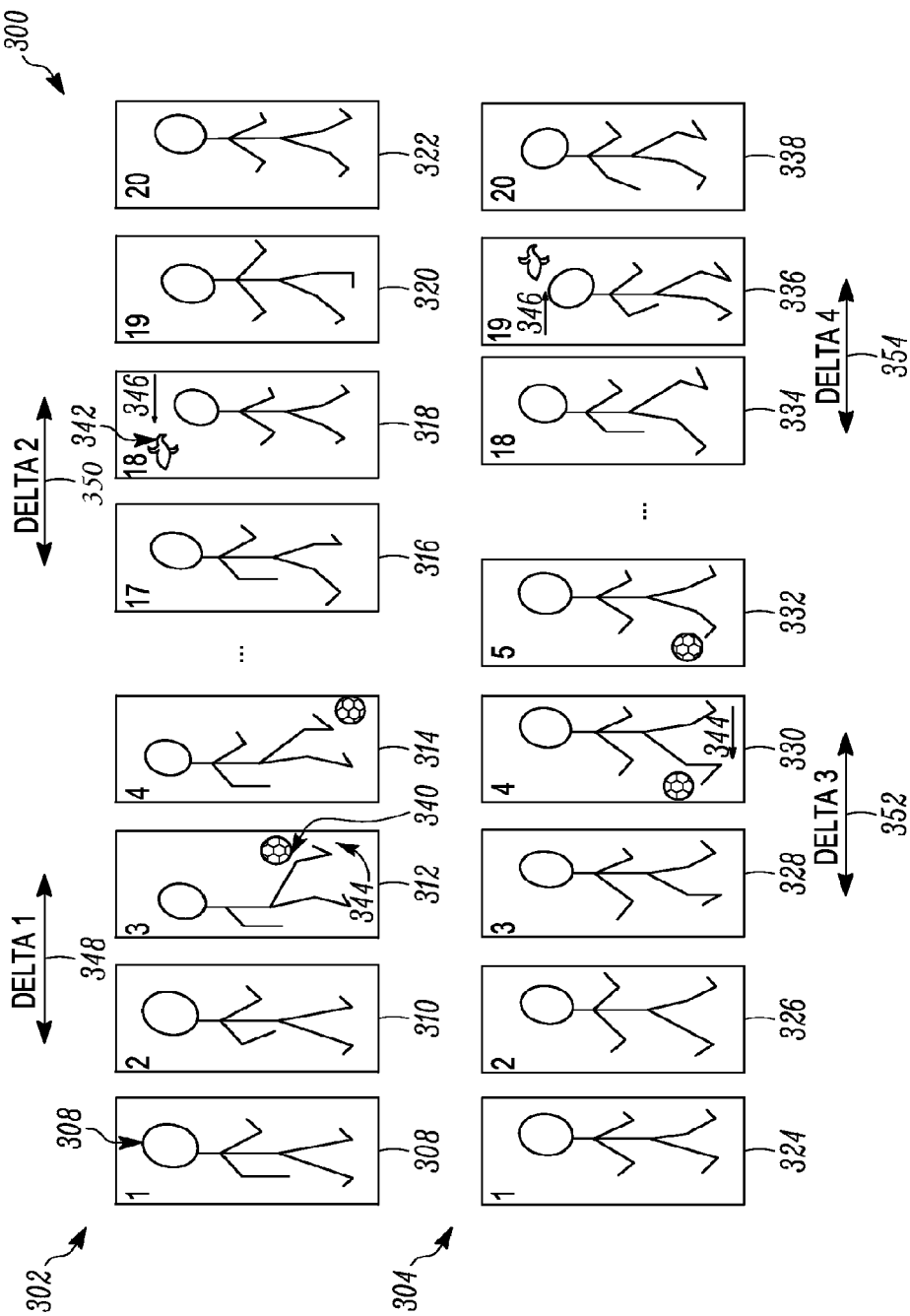
FIG. 3 illustrates two video feeds that need to be synchronized, in accordance with an embodiment of the present invention.

FIG. 3 illustrates two video feeds that need to be synchronized, in accordance with an embodiment of the present invention.

As illustrated in the figure, a scenario 300 includes a video feed 302 and a video feed 304 that need to be synchronized. Video feed 302 contains a sequence of frames 308-322 from one camera source. Video feed 304 contains another sequence of frames 324-338 from another camera source recorded from a different viewpoint. The two camera sources may or may not have the same encoding mechanism. For illustrative purposes, video feed 302 and video feed 304 are shown to contain only twenty frames each with different positions of a person 306.

As illustrated in the figure, frames 308 and 310 include images of person 306 walking, facing towards the right direction. The difference in images between frames 308 and 310 is minimal, and, hence are not good candidates for finding discontinuity. In frame 312, person 306 is kicking a soccer ball 340. As indicated by an arrow 344, this kicking of soccer ball 340 represents a considerable change in the image between frame 310 and frame 312, and is counted as a discontinuity 348, as shown by delta 1.

In accordance with an embodiment of the present invention, the video feeds may be analyzed in parallel to look for discontinuities. Note that the second video feed 304 has no discontinuities found in either frame 324, 326 or 328 since the difference in the images are very minimal. In frame 330, person 306 is kicking soccer ball 340, which represents a discontinuity 352 as indicated by delta 3. Note that discontinuity 348 and discontinuity 352 are very similar even though the images may be very different. Frames 314 and 332 are similar and as compared to their preceding frames, the change in images is minimal.

In accordance with an embodiment of the present invention, a processing system will insert synchronization points based on discontinuity 348 detected in video feed 302 and discontinuity 352 detected in video feed 304 and attempt to align the video feeds. If the video feeds are not completely aligned, it keeps looking for other common discontinuities in video feeds 302 and 304.

Assuming that there was minimal difference in the images between frames 314 to frame 316, there were no discontinuities found. In frame 318, a bird 342 is flying over person 306 indicating a change in the image as shown by an arrow 346. This change between frames 316 and 318 represents another discontinuity 350, as indicated by delta 2. In parallel, a similar discontinuity 354 is found in video feed 304 between frames 334 and 336, as represented by delta 4.

Based on discontinuities 350 and 354, the processing system will further align video feeds 302 and 304. If there is acceptable error between the alignments of two video feeds, the consolidated video feed is ready for producing a multi-dimensional model of the common event. If the two video feeds are still not aligned, the processing system will look for more discontinuities based on a pre-determined number. In a non-limiting example embodiment, the pre-determined number is two, wherein the processing system will continue to look until it finds two consecutive aligned discontinuities.

In an example embodiment, the processing system first decodes the video feeds before comparing different video feeds for discontinuity. There may be cues in the image, which may be based on the movement in one embodiment or on the sound in another embodiment, which can be used to determine a discontinuity. As long as the motions or changes are visible from each independent feed, tags can be created to mark those changes for synchronization.

A random point that is available or visible through almost 360° of view is preferable for inserting synchronization points. In one embodiment, motion of that point can be used as synchronization point in the video. For example, if it is determined that there is a wrist in the video with the hand moving up or down, it indicates a change in the motion. In this example, a synchronization point can be inserted at the wrist, which will determine the delay in time with respect to each of the feeds. Once a synchronization point is inserted in a video, a delay computation can be performed to align all the feeds.

In accordance with an embodiment of the present invention, the proposed method provides a feedback process to look for discontinuities in all the video streams in parallel, while searching for common discontinuity. In one embodiment, the feedback process attempts to find a pre-determined number of discontinuities in the video feeds. The video streams may be raw, encoded or decoded. As an example, the frames with much more information as compared to the other frames are an indication of changes in the image, and are good candidates for finding discontinuities. For example, in the case of MPEG streams having one complete frame and deltas for the rest of the frames, a large delta is an indication of considerable changes.

The process, in accordance with an embodiment of the present invention, keeps searching for common discontinuities in parallel on all the streams and attempts to time align the feeds once the first discontinuity is found. The process attempts to keep synchronizing the feeds while looking for more discontinuities. If the feeds are not lined up, the process attempts to re-adjust and keeps performing the discontinuity detection and time adjustment until an acceptable error is achieved. In one embodiment, the acceptable error is based on a pre-determined number. If all the feeds are time aligned, the process has achieved the desired synchronization and a multi-dimensional image can be created. A processing system implementing the process, in accordance with an embodiment of the present invention, is described with the help of FIG. 4.

Figure 4:
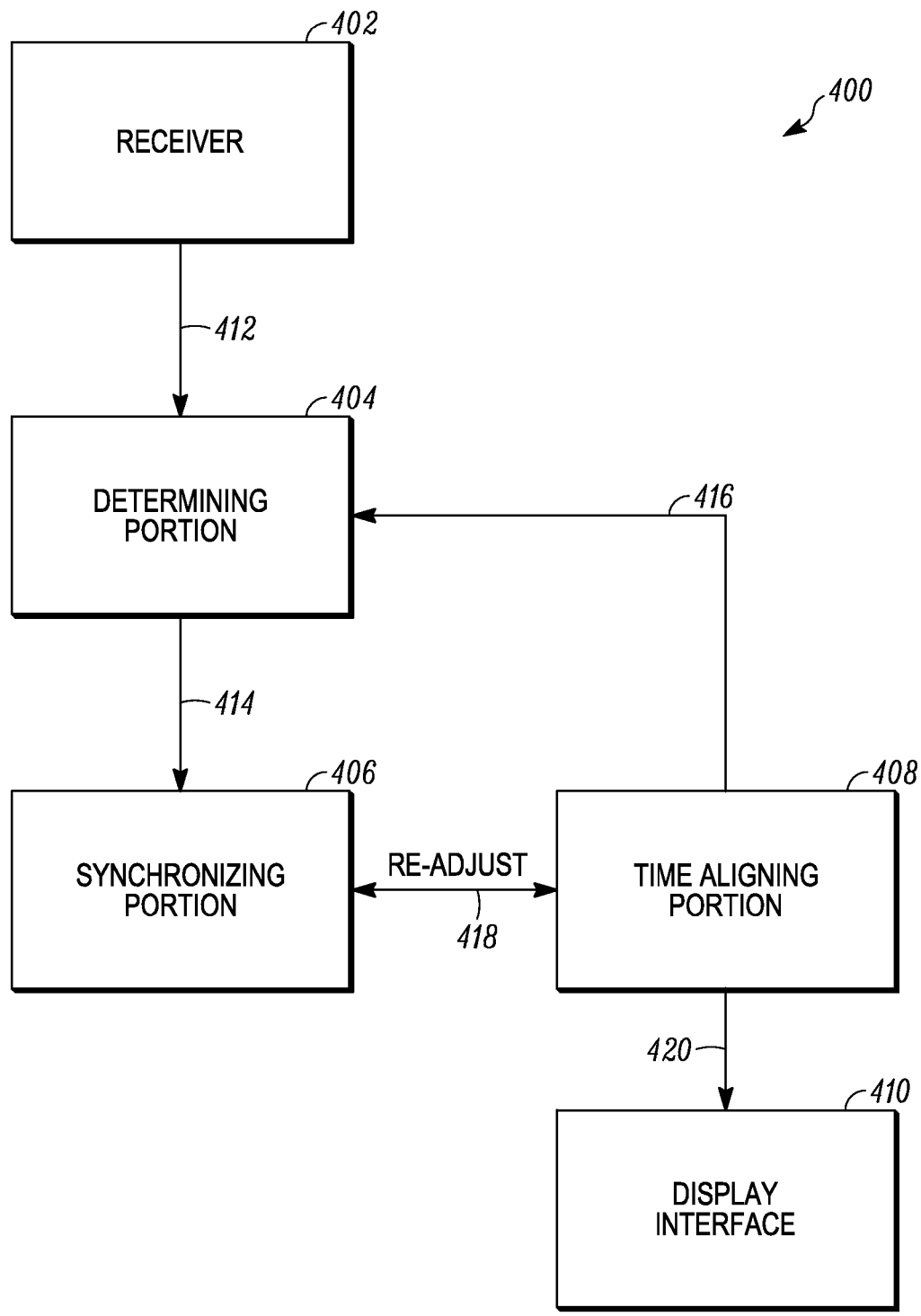
FIG. 4 illustrates a processing system, in accordance with an embodiment of the present invention.

FIG. 4 illustrates a processing system 400, in accordance with an embodiment of the present invention.

As illustrated in the figure, processing system 400 includes a receiver 402, a determining portion 404, a synchronizing portion 406, a time aligning portion 408 and a display interface 410. In this example, receiver 402, determining portion 404, synchronizing portion 406, time aligning portion 408 and display interface 410 are distinct elements. However, in some embodiments, at least two of receiver 402, determining portion 404, synchronizing portion 406, time aligning portion 408 and display interface 410 may be combined as a unitary element. In other embodiments, at least one of receiver 402, determining portion 404, synchronizing portion 406, time aligning portion 408 and display interface 410 may be implemented as a computer having stored therein tangible, non-transitory, computer-readable media for carrying or having computer-executable instructions or data structures stored thereon. Such tangible, non-transitory, computer-readable media can be any available media that can be accessed by a general purpose or special purpose computer. Non-limiting examples of tangible, non-transitory, computer-readable media include physical storage and/or memory media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a tangible, non-transitory, computer-readable medium. Combinations of the above should also be included within the scope of tangible, non-transitory, computer-readable media.

Receiver 402 is operable to receive various video feeds from different camera sources and to generate video outputs via a signal 412 to determining portion 404. The video feeds received by receiver 402 may be raw, i.e., without any encoding, or may be encoded with different or same encoding mechanism. In one embodiment, receiver 402 receives video feeds that have been encoded with different formats, such as video feeds from camcorder 102, mobile phone 104, mobile phone 106, mobile phone 108 and computer tablet 110, and performs decoding of the video streams before forwarding it to determining portion 404. In one embodiment, receiver 402 decodes the video streams into a common format. In one embodiment, receiver 402 includes a memory for buffering the incoming streams.

Determining portion 404 is operable to detect common discontinuities in the video outputs received from receiver 402, based on a predetermined criterion. Some non-limiting examples of the criterion include changes in motion, audio, color, brightness, etc. As discussed earlier, feed frames with a lot more information as compared to other frames in the feed are good candidates for spotting discontinuities.

Determining portion 404 keeps comparing different video feeds to find the common discontinuity in each feed until all the feeds are time aligned and a pre-determined number of common discontinuities is reached. In one embodiment, determining portion 404 uses various techniques, such as, centering the object of interest, rotation of the video content, or scaling the object of interest, in order to find discontinuity in the feeds. By centering the object of interest, the object of interest can be identified by facial recognition or motion detection. Rotating the video contents allows for direct comparison of images once the contents are aligned in the same plane. Scaling the object to similar dimensions provides the user with a point of reference for comparison.

Synchronizing portion 406 is operable to synchronize the video outputs by inserting the synchronization points based on the discontinuity information provided by determining portion 404 via a signal 414. Synchronizing portion 406 is further operable to receive a re-adjust signal 416 from time aligning portion 408 in order to adjust the synchronization of the video outputs, if the feeds are not aligned. Synchronizing portion 406 bi-directionally communicates with time aligning portion 408 via a signal 418 in order to exchange information regarding the synchronization points.

Time aligning portion 408 is operable to compare synchronized video feeds by performing time adjustment in feedback mode with synchronizing portion 406 and determining portion 404 such that the video feeds are aligned based on the synchronization points. In one embodiment of the invention, the content can be compared manually and the delays of individual feeds can be adjusted to align the feeds. Once all the feeds are aligned, time aligning portion 408 provides the synchronized video to display interface 410 via a signal 420. Alignment of different frames using discontinuities is explained in greater detail below.

In an example embodiment, time aligning portion 408 designates one feed's discontinuity as a master discontinuity. All the other feeds' discontinuities are referred to as 'preceding', 'now' and 'following' with respect to the master discontinuity. The error between the master discontinuity and each of the 'preceding', 'now' and 'following' discontinuities for other feeds is calculated. Each feed's discontinuity with minimum error is declared as "winner" indicating the closest discontinuity in time with respect to the master discontinuity. Each feed's winner becomes the timing reference when analyzing the next master discontinuity. Time aligning portion 408 keeps analyzing the preceding, now and following discontinuities with respect to the master discontinuity until the convergence occurs. This is further explained with the help of FIGS. 5A-5B.

Figure 5A:
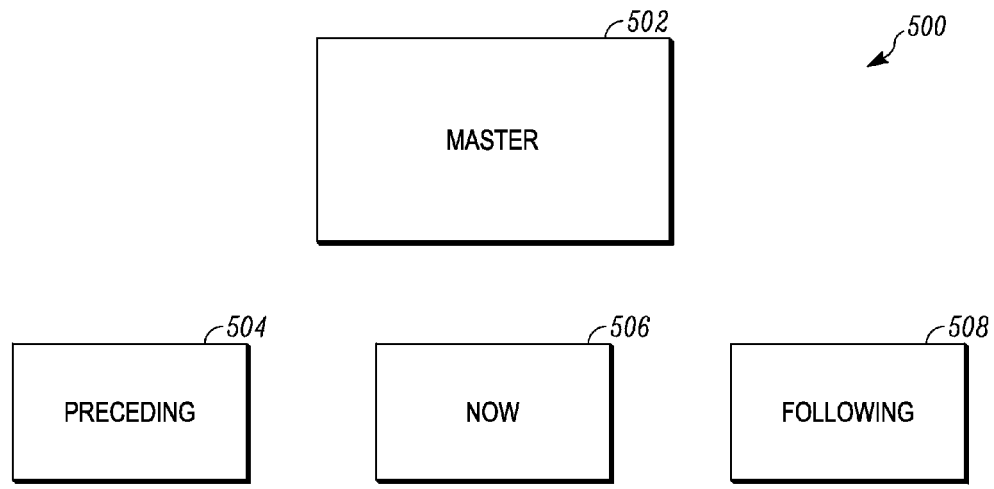
FIGS. 5A-5B illustrate a method for aligning different feeds using discontinuities, in accordance with an embodiment of the present invention.
Figure 5B:
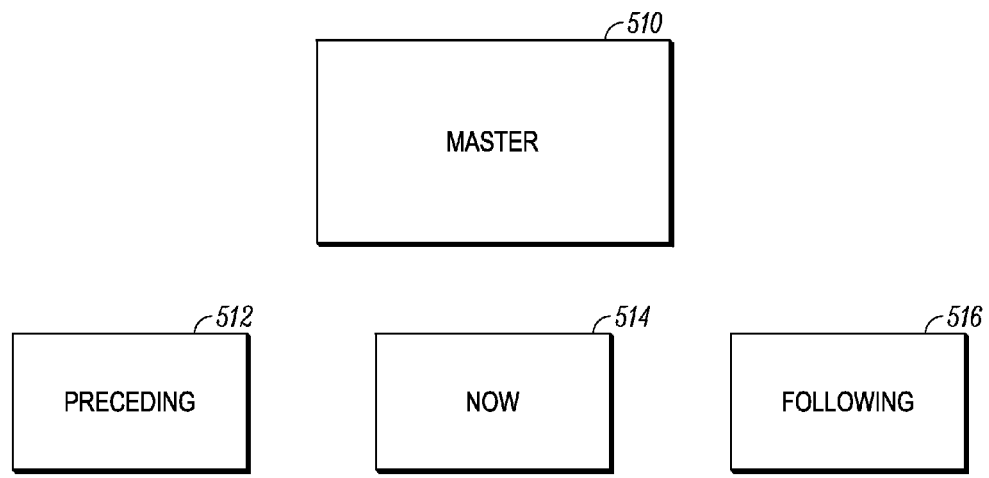

FIGS. 5A-5B illustrate a method 500 for aligning different feeds using discontinuities, in accordance with an embodiment of the present invention.

FIG. 5A includes a master discontinuity 502, a preceding discontinuity 504, a now discontinuity 506 and a following discontinuity 508 for two video feeds, namely first and second video feeds. Master discontinuity 502 represents the difference in two successive frames of the first video feed. The difference may be based on motion, image and/or sound as discussed earlier. Preceding-discontinuity 504 represents the difference in two frames of the second video feed, which occurs earlier in time with respect to master discontinuity 502. Now-discontinuity 506 represents the difference in two frames of the second video feed, which occurs at the same time as master discontinuity 502. Following-discontinuity 508 represents the difference in two frames of the second video feed, which occurs later in time than master discontinuity 508.

Referring back to FIG. 3, assuming video feed 302 is the first video feed and video feed 304 is the second video feed, master discontinuity 502 is same as discontinuity 348 for video feed 302. Assuming there is no preceding-discontinuity 504 in this example, now-discontinuity 506 is same as discontinuity 352 and following-discontinuity 508 is same as discontinuity 354 for video feed 304.

In accordance with an embodiment of the present invention, time aligning portion 408 attempts to calculate errors of preceding-discontinuity 504, now-discontinuity 506 and following-discontinuity 508 from master discontinuity 502. In this example, if the error between now-discontinuity 506 and master discontinuity 502 is the smallest, now-discontinuity 506 is declared as the 'winner' and the second video feed becomes the timing reference for analysis of the next discontinuity, as shown with the help of FIG. 5B.

As illustrated in FIG. 5B, a second discontinuity 510 of the second video feed has been designated as a new master discontinuity and a discontinuity 512 has been designated as the preceding-discontinuity, a discontinuity 514 is designated as a now-discontinuity, and a discontinuity 516 is designated as a following-discontinuity. Now the error of discontinuity 512, discontinuity 514 and discontinuity 516 is calculated from master discontinuity 510 to determine the discontinuity with minimum error.

Referring back to the example of FIG. 3, discontinuity 354 is the new master discontinuity for video feed 304. Discontinuity 348 is similar to preceding-discontinuity 512 and discontinuity 350 is similar to now-discontinuity 514. Note that there is no following discontinuity shown in the example of FIG. 3 for master discontinuity 354. The error of discontinuity 348 and discontinuity 350 is calculated from discontinuity 354 and video feed having the discontinuity with minimum error becomes the timing reference when analyzing the next discontinuity. Time aligning portion 408 keeps analyzing the preceding-, now- and following-discontinuities with respect to the master discontinuity for a pre-determined number of times, until an acceptable error is achieved.

As discussed with the help of FIGS. 5A-5B, different discontinuities are analyzed to generate an aligned content, in accordance with an embodiment of the present invention, which can then be displayed at the original centering, gain and rotation without fear of distortion. The same method is applied for analyzing discontinuities in more than two video feeds, where the error between the discontinuities in the third video feed is calculated from the master feed and so on.

Referring back to FIG. 4, display interface 410 is operable to use the aligned content for recreating a multi-view video montage or feeding it into a 3-D correlation program. Different actions, such as, rotate, twist, or center, can be performed on the multi-dimensional model. As a result, the information contained in original video feeds is presented as-is to the consumer with varying delays and resolutions. As an example, a 3-D image can be created based on multiple views provided by various camera feeds that can be used for forensic analysis of a catastrophic event.

As discussed with reference to FIGS. 4, 5A and 5B, in accordance with embodiments of the present invention, a common characteristic is determined given a plurality of random video feeds. The common characteristic can be based on changes in motion, audio, image, etc., between the frames. Synchronization points are inserted in the video feeds based on the common characteristic in order to time align the video feeds. Once the video feeds are time aligned, a multi-dimensional model can be created. The feedback process, in accordance with an embodiment of the present invention, is described with the help of a flowchart in FIG. 6.

Figure 6:
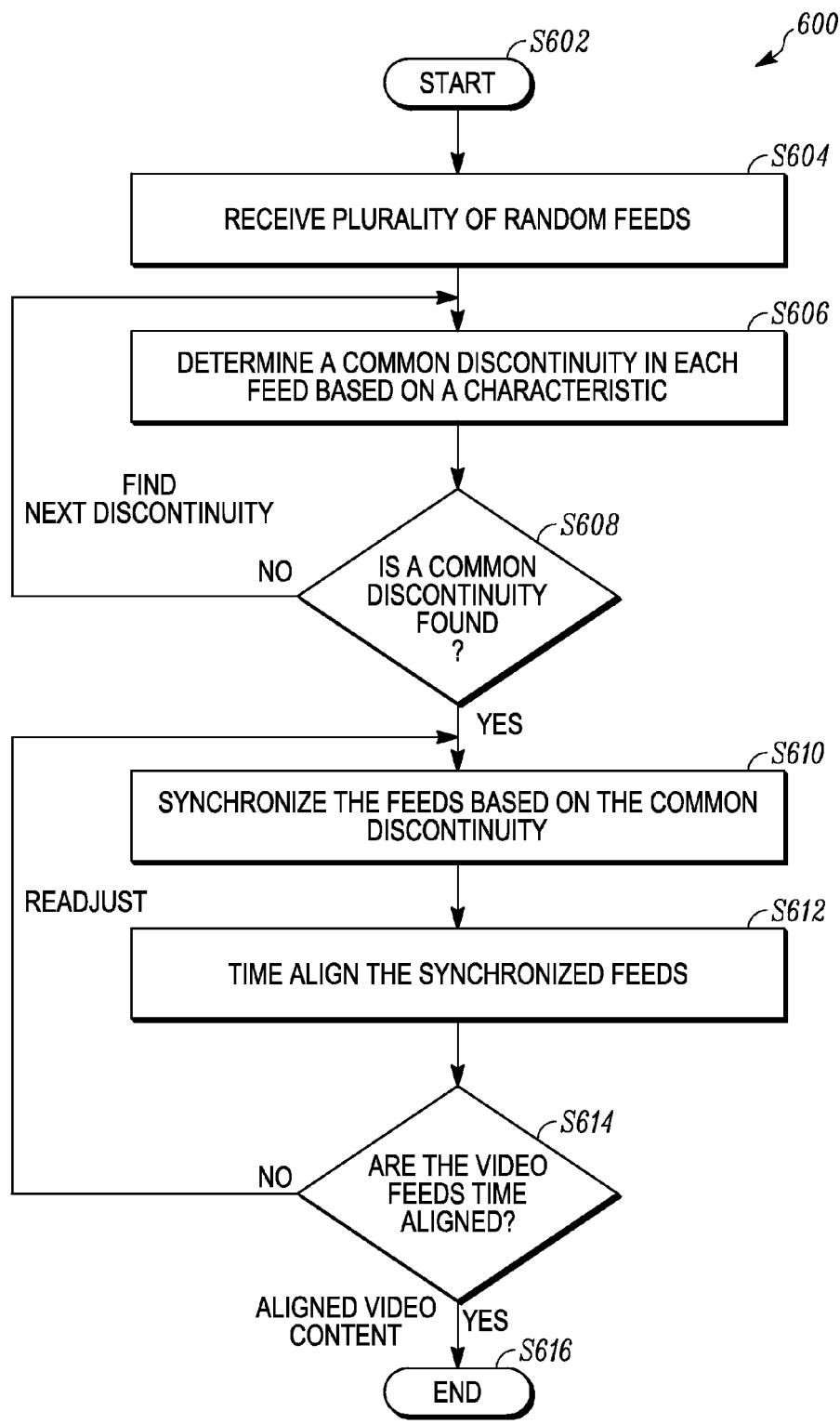
FIG. 6 illustrates a flowchart, in accordance with an embodiment of the present invention.

FIG. 6 illustrates a flowchart of a process 600, in accordance with an embodiment of the present invention.

As illustrated in the figure, the process begins (S602), when receiver 402 receives a plurality of random feeds from various camera sources (S604). As discussed earlier, receiver 402 may decode the video streams if needed. In one embodiment, all the video streams are decoded in one common format.

Determining portion 404 analyzes all the video feeds and attempts to find a common discontinuity in each feed based on a characteristic (S606). The characteristic can be based on a pre-determined criterion, such as, motion, audio, image, etc., as discussed earlier with reference to FIG. 4.

If a common discontinuity is not found, determining portion 404 attempts to find the next common discontinuity between the feeds (S608). In one embodiment, determining portion 404 attempts to find the common discontinuities for a pre-determined number of times.

When a common discontinuity has been found, synchronizing portion 406 synchronizes the feeds by inserting synchronization points based on the common discontinuity (S610).

Time aligning portion 408 attempts to time align the synchronized feeds once the synchronization points are inserted (S612). In one embodiment of the invention, time aligning portion 408 attempts to time align the synchronized feeds by adjusting delays of individual feeds.

Time aligning portion 408 continues to check whether the video feeds are aligned or not in a feedback loop (S614). If the video feeds are not aligned, time aligning portion 408 provides a feedback to synchronizing portion 406 to re-adjust. Synchronizing portion 406 attempts to re-adjust the synchronization by manipulating the synchronization points based on the common discontinuity.

If the feeds are time aligned, time aligning portion 408 has succeeded in aligning the video content and the process ends (S616).

The time aligned content can be used by display interface portion 410 to generate a video output that can be used to provide the best available shot of an event or to reconstruct an image based on different views of the activity provided by multiple camera sources.

As discussed with reference to FIG. 4, feedback process 400 receives a plurality of random video feeds for synchronization. In accordance with embodiments of the present invention, synchronization points are inserted in the video outputs based on the common discontinuities found in the video feeds. The common discontinuities can be based on a pre-determined criterion. Synchronized video outputs are time aligned in a feedback mode until the video content is time aligned by re-adjusting the synchronization points. Time aligned video output can be used for recreating a multi-view video montage or feeding it into a 3-D correlation program.

The foregoing description of various preferred embodiments of the invention have been presented for purposes of illustration and description. It is not intended to be exhaustive or to limit the invention to the precise forms disclosed, and obviously many modifications and variations are possible in light of the above teaching. The example embodiments, as described above, were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed as new and desired to be protected by Letters Patent of the United States is:

1. A device for use with a first video feed and a second video feed, the device comprising:
   a receiver operable to receive the first video feed, to receive the second video feed, to generate a first output video based on the first video feed, and to generate a second output video based on the second video feed; and
   a processor and a synchronizer coupled to the receiver, the processor and the synchronizer configured to:
      detect a first discontinuity between sequential frames of the first video feed;
      detect a second discontinuity between sequential frames of the first video feed;
      detect a third discontinuity between sequential frames of the second video feed;
      detect a fourth discontinuity between sequential frames of the second video feed;
      insert a synchronization point in the first output video based on the first discontinuity and a synchronization point in the second output video based on the third discontinuity;
      align the second output video with the first output video by matching the synchronization point based on the first discontinuity with the synchronization point based on the third discontinuity;
      insert a synchronization point in the first output video based on the second discontinuity and a synchronization point in the second output video based on the fourth discontinuity; and
      adjust the alignment of the first output video and the second output video by further aligning the second output video with the first output video to match the synchronization point based on the second discontinuity with the synchronization point based on the fourth discontinuity.

2. The device of claim 1, the processor and the synchronizer further configured to:
   detect the first discontinuity and the third discontinuity in parallel; and
   detect the second discontinuity and the fourth discontinuity in parallel.

3. The device of claim 1, the processor and the synchronizer further configured to detect the first discontinuity based on one or more of image data, audio data, motion detection, or facial recognition.

4. The device of claim 1, the processor and the synchronizer further configured detect the second discontinuity based on one or more of image data, audio data, motion detection, or facial recognition.

5. The device of claim 1,
   the processor and the synchronizer further configured to provide a consolidated output video, the consolidated output video being the result of the further aligning of the second output video with the first output video.

6. The device of claim 5, the consolidated output video being a three dimensional (3-D) video.

7. The device of claim 5, the consolidated output video being a multi-view montage.

8. A method of using a first video feed and a second video feed, comprising:
   receiving, via a receiver, the first video feed and the second video feed;
   generating, via the receiver, a first output video based on the first video feed and a second output video based on the second video feed;
   detecting a first discontinuity between sequential frames of the first video feed;
   detecting a second discontinuity between sequential frames of the first video feed;
   detecting a third discontinuity between sequential frames of the second video feed;
   detecting a fourth discontinuity between sequential frames of the second video feed;
   inserting a synchronization point in the first output video based on the first discontinuity and in the second output video based on the third discontinuity;
   aligning the second output video with the first output video by matching the synchronization point based on the first discontinuity with the synchronization point based on the third discontinuity;
   inserting a synchronization point in the first output video generating a based on the second discontinuity and in the second output video based on the fourth discontinuity; and
   adjusting the alignment of the first output video and the second output video by further aligning the second output video with the first output video to match the synchronization point based on the second discontinuity with the synchronization point based on the fourth discontinuity.

9. The method of claim 8, wherein detecting the first discontinuity is performed in parallel with detecting the third discountinuity; and
   wherein detecting the second discontinuity is performed in parallel with detecting the fourth discontinuity.

10. The method of claim 8, the detecting of the first discontinuity being based on one or more of image data, audio data, motion detection, or facial recognition.

11. The method of claim 8, the detecting of the second discontinuity being based on one or more of image data, audio data, motion detection, or facial recognition.

12. The method of claim 8, further comprising:
providing a consolidated output video, the consolidated output video being the result of further aligning the second output video with the first output video.

13. The method of claim 12, the consolidated output video being a three dimensional (3-D) video.

14. The method of claim 12, the consolidated output video being a multi-view montage.

15. A system comprising:
a computing device;
one or more processors; and
one or more computer-readable storage memory devices comprising instructions that are executable by the one or more processors to cause the computing device to perform operations comprising:
receiving, via a receiver, a first video feed and a second video feed;
generating, via the receiver, a first output video based on the first video feed and a second output video based on the second video feed;
detecting a first discontinuity between sequential frames of the first video feed;
detecting a second discontinuity between sequential frames of the first video feed;
detecting a third discontinuity between sequential frames of the second video feed;
detecting a fourth discontinuity between sequential frames of the second video feed;
inserting a synchronization point in the first output video based on the first discontinuity and in the second output video based on the third discontinuity;
aligning the second output video with the first output video by matching the synchronization point based on the first discontinuity with the synchronization point based on the third discontinuity;
inserting a synchronization point in the first output video based on the second discontinuity and in the second output video based on the fourth discontinuity; and
adjusting the alignment of the first output video and the second output video by further aligning the second output video with first output video to match the synchronization point based on the second discontinuity with the synchronization point based on the fourth discontinuity.

16. The system of claim 15, wherein detecting the first discontinuity is performed in parallel with detecting the third discontinuity and;
wherein detecting the second discontinuity is performed in parallel with detecting the fourth discontinuity.

17. The system of claim 15, wherein detecting the first discontinuity is based on one or more of image data, audio data, motion detection, or facial recognition.

18. The system of claim 15, wherein detecting the second discontinuity is based on one or more of image data, audio data, motion detection and facial recognition.

19. The system of claim 15, the operations further comprising:
providing a consolidated output video, the consolidated output video being the result of the further aligning of the second output video with the first output video.

20. The system of claim 19, the consolidated output video being a three dimensional (3-D) video.

21. The system of claim 19, the consolidated output video being a multi-view montage.

* * * * *